No. 816,092. PATENTED MAR. 27, 1906.
F. A. HOLMES.
ICE CREAM FREEZER.
APPLICATION FILED SEPT. 20, 1905.

Witnesses
E. F. Stewart
C. N. Woodward

Fred A. Holmes,
Inventor.
by C. A. Snow & Co.
Attorneys

UNITED STATES PATENT OFFICE.

FRED A. HOLMES, OF EASTPORT, MAINE.

ICE-CREAM FREEZER.

No. 816,092.  Specification of Letters Patent.  Patented March 27, 1906.

Application filed September 20, 1905. Serial No. 279,323.

*To all whom it may concern:*

Be it known that I, FRED A. HOLMES, a citizen of the United States, residing at Eastport, in the county of Washington and State of Maine, have invented a new and useful Ice-Cream Freezer, of which the following is a specification.

This invention relates to refrigerating apparatus, and has for its object to improve the construction and increase the efficiency and utility of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

Figure 1:
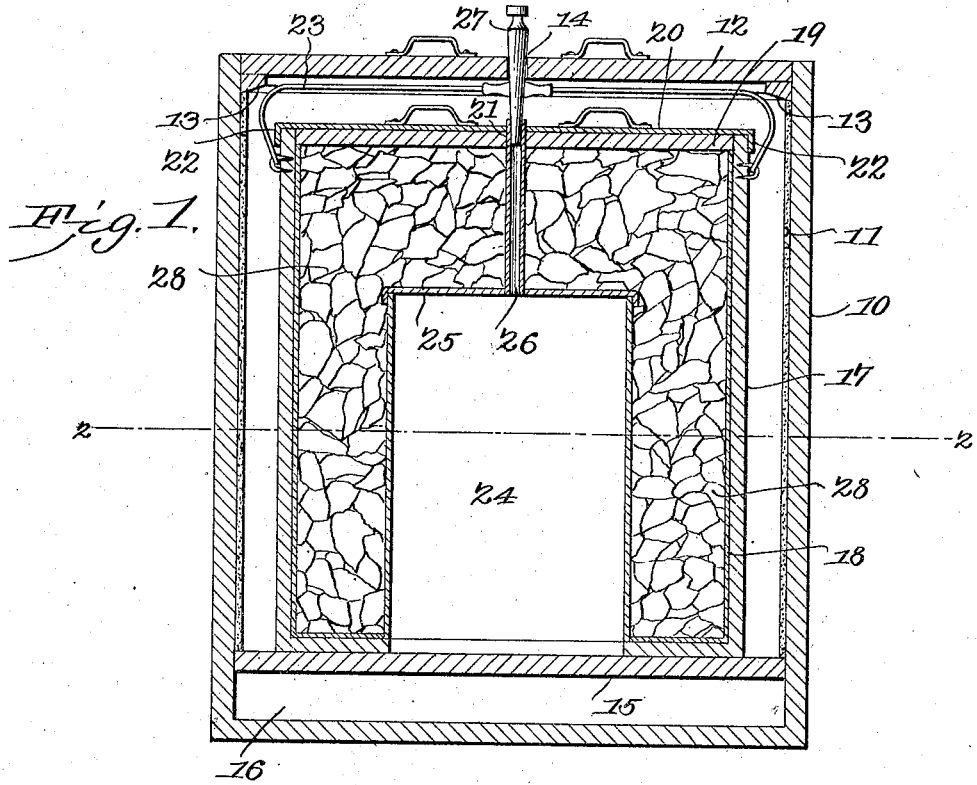
Figure 2:
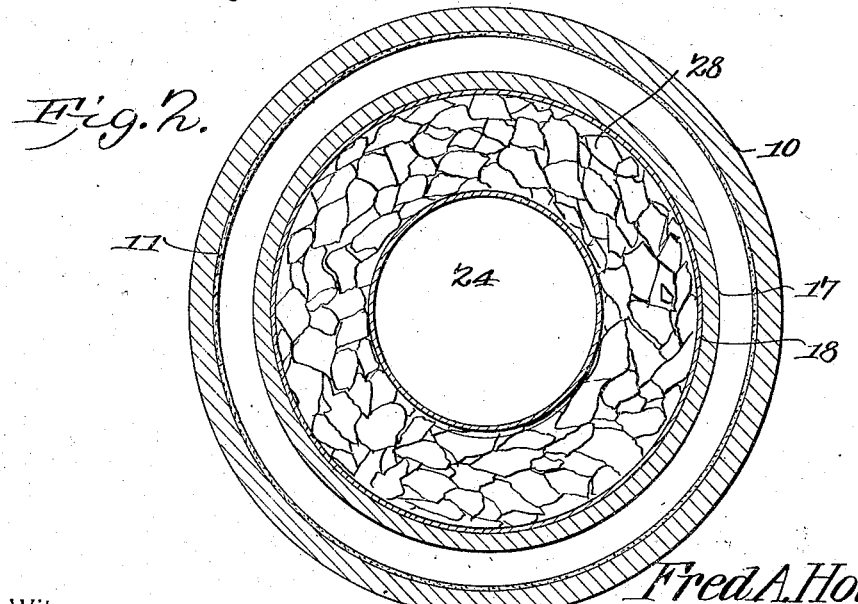

In the drawings, Figure 1 is a longitudinal sectional elevation, and Fig. 2 is a transverse section on the line 2 2 of Fig. 1 of the improved apparatus.

The improved apparatus comprises an outer casing or shell 10, preferably in circular shape and with the side walls of non-conductive material, such as wood lined with asbestos, the latter indicated at 11. The casing 10 is provided with a detachable cover 12, resting upon an annular cleat 13, and with a central aperture 14. Within the outer casing 10 and near its lower end is a transverse partition 15, spaced from the bottom and forming a dead-air chamber 16, the partition being likewise of non-conductive material, such as wood. Disposed within the outer casing 10 is an inner casing 17, spaced from the outer casing and supported upon the partitions 15. The walls of the casing 17 are of non-conductive material, such as wood, and lined with sheet metal, as at 18, and with a detachable cover 19, also of wood or other non-conductive material, and with a sheet-metal casing-sheathing 20, the sheathing and cover having central apertures 21 in alinement with the aperture 14 in the cover 12 of the outer casing. The wood portion 19 of the cover of the inner casing bears inside the side walls of the inner casing, while the sheathing 20 is provided with a flange 22, depending over the outer face of the side walls of the casing 17, as shown in Fig. 1. By this means a close and substantially air-tight joint is formed between the inner casing and its cover. The inner casing 17 is provided with a bail 23, by which to handle the same.

Formed within the casing 17 is an interior chamber 24, open at the lower end and with its upper end spaced below the detachable cover 19 of the inner casing. Rising from the top member 25 of the chamber 24 is a tube 26, extending through the apertures 21 of the cover 19 and its sheathing 20. A detachable plug 27 is inserted through the aperture 14 in the closure 12 and is seated in the upper end of the tube 26 to provide a ready means of closing the tube and apertures when required.

The various casings and chambers can be of any required size and employed for refrigerating any required materials or products or articles, but is more particularly designed for preserving ice-cream and like products for an indefinite time and in position for ready access when required.

In operating the device the inner casing 17 is filled with the refrigerating material, such as ice commingled with salt and indicated at 28, and the cover 19 20 placed in position thereon. The material or products to be refrigerated are then placed upon the partition 15 centrally of the casing 10 and the charged inner casing set down over the articles, the latter then being within the chamber 24. The closure 12 is then placed in position and the plug 27 inserted to shut off all ingress of outside air.

The tube 26 provides a ready means for ventilating the chamber 24 if articles are placed therein which require ventilation, and the tube may also be employed for receiving the handle of an ice-cream freezer when the device is utilized to support an ice-cream freezer within the chamber 24.

It will thus be noted that when all the parts are assembled the internal storage-chamber is completely surrounded by ice, except at the bottom, and that both the storage-chamber and ice-chamber are completely surrounded by the dead-air spaces, which forms an effectual non-conducting packing and materially increases the efficiency of the device.

Having thus described the invention, what is claimed is—

In a refrigerating apparatus, an outer casing having a detachable cover provided with a central aperture and with a transverse partition spaced from the bottom of the casing and forming a dead-air space in the bottom of the same, an inner casing spaced from the outer casing and supported upon said partition, said inner casing having a detachable cover and with an internal chamber opening downwardly, a tube extending from said chamber through the cover to said inner casing and in alinement with the aperture in the cover to the outer casing and a detachable plug extending through the aperture in said outer casing and seated in said tube.

In testimony that I claim the foregoing as my own I have hereto affixed my signature in the presence of two witnesses.

FRED A. HOLMES.

Witnesses:
   GEO. H. HAYES,
   H. J. SHERLOCK.